United States Patent
Mazumder (10) Patent No.: US 8,837,036 B2
(45) Date of Patent: Sep. 16, 2014

(54) DYNAMIC TERAHERTZ SWITCH USING PERIODIC CORRUGATED STRUCTURES

(75) Inventor: Pinaki Mazumder, Ann Arbor, MI (US)

(73) Assignee: Pinaki Mazumder, Ann Arbor, MI (US)

( * ) Notice: Subject to any disclaimer, the term of this patent is extended or adjusted under 35 U.S.C. 154(b) by 865 days.

(21) Appl. No.: 12/842,997

(22) Filed: Jul. 23, 2010

(65) Prior Publication Data

US 2012/0019901 A1  Jan. 26, 2012

(51) Int. Cl.
- *G02F 1/29* (2006.01)
- *G02F 1/13* (2006.01)
- *G02F 1/313* (2006.01)
- *G02F 1/365* (2006.01)

(52) U.S. Cl.
CPC .............. *G02F 1/313* (2013.01); *G02F 1/1326* (2013.01); *G02F 2202/30* (2013.01); *G02F 2203/13* (2013.01); *G02F 1/365* (2013.01); *G02F 2203/10* (2013.01); *G02F 2202/32* (2013.01)
USPC .......................................... 359/320; 359/315

(58) Field of Classification Search
USPC ......... 359/245, 247, 254, 315, 318, 320–322, 359/900; 372/26
See application file for complete search history.

(56) References Cited

U.S. PATENT DOCUMENTS

| | | | |
|---|---|---|---|
| 6,542,682 B2 * | 4/2003 | Cotteverte et al. ............ | 385/125 |
| 7,116,864 B2 * | 10/2006 | Yanik et al. ..................... | 385/27 |
| 8,111,443 B1 * | 2/2012 | Russell et al. ................. | 359/245 |
| 2006/0109541 A1 * | 5/2006 | Osipov et al. ................. | 359/321 |
| 2009/0262766 A1 * | 10/2009 | Chen et al. ..................... | 372/26 |
| 2013/0266034 A1 * | 10/2013 | Yu et al. .......................... | 372/27 |

* cited by examiner

*Primary Examiner* — Mahidere Sahle (57) ABSTRACT

A subwavelength terahertz switch using an artificially designed conductor metamaterial is discussed in this invention. Slow-light EM Wave propagating at THZ speed imitates the strongly localized surface plasmon modes and henceforth is called Spoof Surface Plasmon Polariton (SSPP) in this invention. The SSPP mode of slow-light EM propagation can be easily tailored by changing the refractive index of the dielectric materials inside the metallic gap structure engineered as a periodic array of grooves. Thus, the incorporation of electro-optical material which has birefringence such as a nematic liquid crystal (N-LC) or multiple refractive indices into the metallic gap leads to a highly compact and efficient terahertz switch being controlled by a low voltage signal. The THZ dynamic switches can be used to construct linear switches, Y junction switches and Mach Zehnder interferometers.

12 Claims, 12 Drawing Sheets

DYNAMIC TERAHERTZ SWITCH USING PERIODIC CORRUGATED STRUCTURES

FIELD OF THE INVENTION

The invention relates to the fields of THz electronics, THz sensors, plasmonics and slow light photonics, and in particular to subwavelength THz dynamic switching.

BACKGROUND OF THE INVENTION

Even though the terahertz (THz) frequency (0.1-3 THz) remains an underexploited regime in the electromagnetic (EM) spectrum and very little commercial products operating in the THz domain have penetrated in the market, the THz EM spectrum has recently evoked a considerable interest among device and circuit researchers. New investigations are currently underway to identify future promising applications like astronomical remote sensing, medical imaging systems, military detection, and ultrafast computer logic circuit. Specifically, as a basic building block for THz family of devices, passive elements such as waveguide, ring resonator, and filter are now being explored as components for the next generation of integrated circuits. Unfortunately, the conventional index-guiding methods such as plastic ribbons and sapphire fibers are not suitable for THz guiding or focusing, because of their high signal power loss.

As an alternative to solving the damping problems, simple metal wire was recently developed for guiding THz radiation in the form of surface plasmon polariton (SPP) that propagates at the interfacial surface between a dielectric and a metal. Compared to dielectric-based waveguides, the THz SPP wave offers low loss and low dispersion. Therefore, metallic structures for carrying THz signal have gained considerable attention for THz passive elements.

However, a simple metal wire supports weakly guided THz waves because of negligible field penetration into the metallic side in comparison to the dielectric matrix surrounding the metallic wire. To overcome the weak SPP confinement in the THz domain, surface topology engineering can be employed to create holes, grooves, and dimples which mimic realistic SPP behavior at the visible or ultraviolet spectrum. The resulting slow light mode THz signals enhance the subwavelength confinement on the metal surface by generating strongly localized surface bound modes in the highly conductor surface The present invention relates to slow light or SSPP metamateiral in the low frequency domain. For example, metal such as gold in the optical domain generates the surface bound modes originated from the free electron oscillation. Similarly, in the low frequency such as microwave and terahertz domain, we can also establish the surface bound modes on the extremely conducting surfaces perforated by holes, grooves and dimples. The resulting artificially spoof surface plasmon polariton (SSPP) modes (also known as slow light modes) can be easily controlled by the size and spacing of metamaterials.

The highly localized SSPP bound modes along the metallic wire can be controlled by varying its geometrical dimensions such as radius or height.

In addition to the geometry-based method, the dynamic control of SSPP modes can be achieved by changing the refractive index of the indentation of the grooves or the host matrix.

Specifically, the incorporation of nematic liquid crystal (N-LC) into the metallic gap structure, where the SSPP bound modes propagate in the dielectric gap between two textured highly conducting surfaces, allows the device to modulate the resonant frequency of the Fabry-Perot-like wave depending on LC orientation.

The promising ability of the invention is to localize terahertz pulse, provide a high extinction switching ratio and miniaturize the THz switching components for large scale optical integration. Specifically, the slow light propagation enabled by the corrugated metallic gap structure can dramatically shift the resonant frequency at small refractive index changes. Thus, the powerful switching concept based on the resonant frequency modulation can be applied to develop dynamic terahertz components such as switches and logic gates.

The design flexibility of this invention associated with simple micrometer-scale architecture provides a promising method toward controlling or steering the subwavelength THz signal in the future SSPP-based compact digital circuit.

There is a need in optimal SSPP architecture to perform the terahertz switching inside a longitudinal guiding parameters such as height (h), periodic distance (d), thickness (t), grooves width (a) and refractive index (n). Specifically, we want to minimize the operational switching power, signal loss, response time while providing the maximal bandwidth, high extinction ratio and fast recovery time.

SUMMARY OF THE INVENTION

The invention provides the efficient terahertz passive elements by utilizing spoof surface plasmon polariton (SSPP) modes (also known as slow light modes).

The main purpose of this invention is to provide an efficient terahertz switch using SSPP modes along the corrugated metallic gap structures. Specifically, the optimal terahertz switching behavior can be achieved by using SSPP resonant modes which are located at the second band in the photonic band diagram.

The next purpose of this invention is to provide novel methods of forming the terahertz switch. The corrugated metallic gap structure can be considered as resonators array, thus providing the maximum transmittance at specific frequency ($\omega_o$), behaving like THz filters and yielding slow light propagation. Thus, the resonant frequency ($\omega_o$) of this invention can be controlled and selected by choosing the height (h), thickness (t) and refractive index (n) of corrugated metallic gap structure.

The final purpose of this invention is to provide dynamic switches such as linear switches, Y junction switches and Mach-Zehnder interferometers using the optimal slow light modes.

DETAILED DESCRIPTION OF THE INVENTION

An artificially designed metamaterial provides a promising approach toward controlling or steering subwavelength terahertz signal for realizing compact digital circuitries. In particular, this invention uses the corrugated metallic sandwiched structure, which yields optimal terahertz control over input and output.

Dispersion diagram of spoof surface plasmon polariton (SSPP) or slow-light modes along the one-dimensional corrugated periodic metamaterial.

Figure 1:
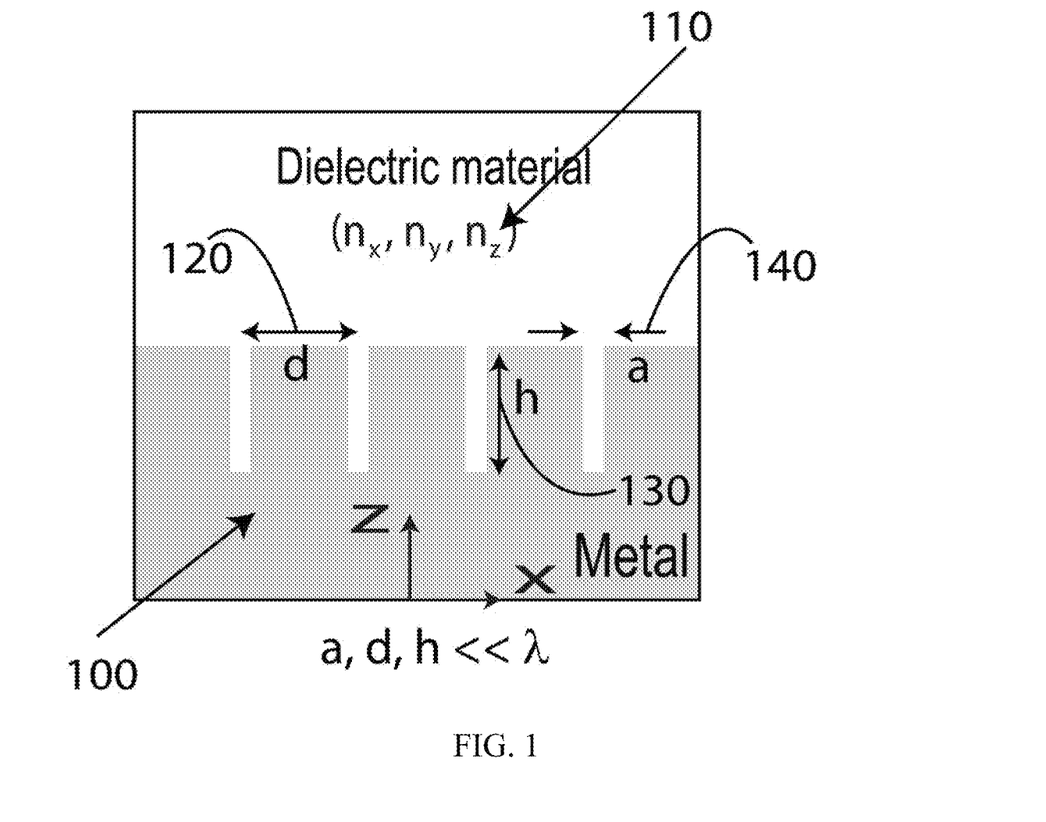
FIG. 1 is a schematic diagram of one-dimensional metallic groove array.

FIG. 1 shows a schematic diagram of one-dimensional grooves array 100 with geometrical parameters, namely, a periodic distance d 120, groove width a 140, groove height h 130 and dielectric refractive index $(n_x, n_y, n_z)$ 110. In particular, the geometrical parameters d 120, a 140, h 130 satisfy with the subwavelength limit (d 120, h 130, a 140<<$\lambda$, wavelength of operational frequency)

Specifically, the invention focuses on the transverse magnetic (TM) modes that have magnetic field is normal to the plane of conductor metamaterial 100. On the contrary, transverse electric (TE) modes are not capable of generating surface bound modes because of boundary condition of Maxwell's equation.

First, one can achieve the surface-bound modes of corrugated metallic structure 100 by analyzing the TM dispersion analysis as a quasi-analytical form, the EM modes can be expanded in terms of Bloch modes that are characteristic waves for periodic structures. The TM dispersion relation of surface bound modes can be described as:

$$1 - j \sum_n \frac{S_n^2 k_{z,II}}{k_{z,I}^{(n)}} \tan(k_{z,II} h) = 0 \quad (1)$$

where j is $\sqrt{-1}$, $k_{x,I}^{(n)} = k_x + 2\pi n/d$, $(k_{x,I}^{(n)}/n_z)^2 + (k_{x,I}^{(n)}/n_x)^2 = (\omega/c)^2$ account for biaxial index ellipsoids with $n_x = \epsilon_x/\epsilon_0$, $n_y = \epsilon_y/\epsilon_0$, $n_x = \epsilon_z/\epsilon_0$ and $S_n = \sqrt{a/d}$ sin c($k_x^n a/2$).

With the help of surface bound condition and subwavelength limit, the zero order (n=0) dominates among all other diffraction modes. Thus, the TM dispersion relation of surface bound modes can be simplified as:

$$\sqrt{n_x^2 \frac{k_x^2}{n_z^2} - n_x^2 \frac{\omega^2}{c^2}} = n_x \frac{\omega}{c} S_0^2 \tan\left(\frac{n_x \omega h}{c}\right) \quad (2)$$

In the limit $k_x a \ll a$, (2) becomes $$k_x \approx n_z \frac{\omega}{c} \sqrt{1 + \left(\frac{a}{d}\right)^2 \tan\left(\frac{n_x \omega h}{c}\right)} \quad (3)$$

Figure 2:
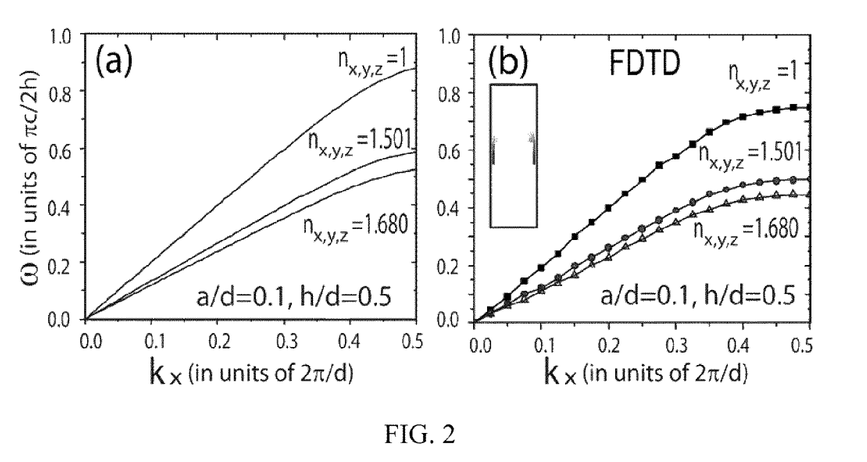
FIG. 2(a) shows the dispersion curves of SSPP modes calculated from analytical calculation.
FIG. 2(b) shows the dispersion curves of SSPP modes calculated from finite difference time domain method.

FIG. 2 (a) shows the TM dispersion relation for SSPP bound modes supported by a periodically corrugated perfect conductor 100 with geometrical parameters a/d=0.1 and h/d=0.5 as illustrated in FIG. 1 using (3). Three different isotropic refractive indices are analyzed: $n_{x,y,z}=1$, $n_{x,y,z}=1.501$, and $n_{x,y,z}=1.680$. For SSPP modes, at the long wavelength ($\lambda \gg d$ 120), the SSPP dispersion curves asymptotically approach the light line $k_x = n_z \omega/c$ because the EM wave does not recognize the fine periodic structure. However, as the frequency increases up to the cutoff frequency $\omega_c$, the highly localized surface bound modes are generated along the textured structure. Therefore, the SSPP modes can be easily modulated by varying the refractive index n 110, thus providing the feasibility of dynamic THz components such as switch and multiplexers.

In addition, FIG. 2(b) shows the dispersion diagram of SSPP modes calculated from FDTD data. These band diagrams can be analyzed in the form of periodic Bloch modes, which means the EM field satisfies the Bloch periodic boundary condition. Even though the results of FDTD are similar to the analytical method, the small difference between analytical calculations and FDTD results is explained by the multiple order terms in (1). In FIG. 2(b), we disregard the high-order terms in (2) and (3), thereby pushing up the dispersion curve along the z-axis.

Dynamic Terahertz Switch

Figure 3:
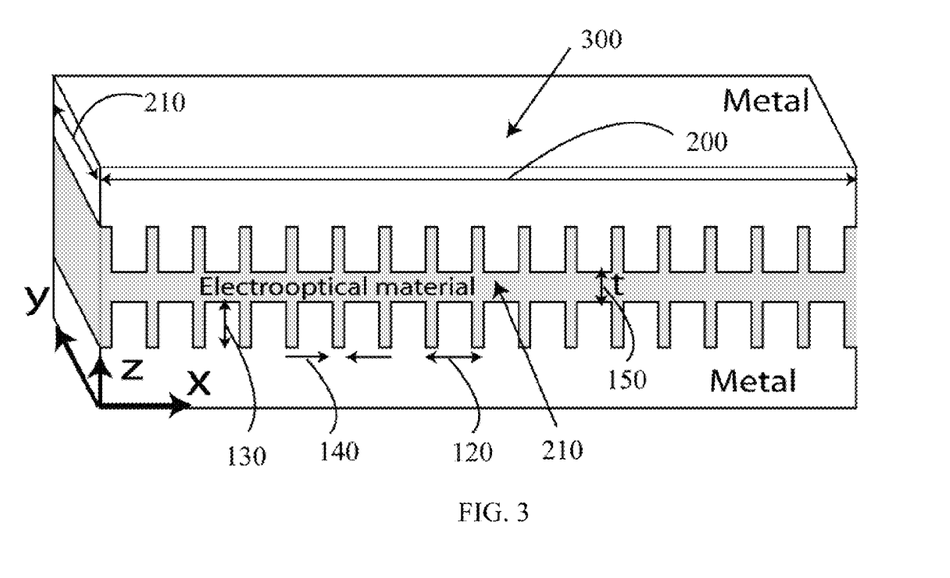
FIG. 3 is a schematic view of a metallic gap structure with periodic distance d, groove width a, groove height h, thickness t and width w.

We focus on the practical terahertz switch design based on the periodic corrugated metallic gap structure as illustrated in FIG. 3.

FIG. 3 shows a basic schematic picture of the terahertz SSPP switch 300 consisting of a dielectric gap 210 between corrugated metamaterial with geometrical parameters periodic distance d 120, groove width a 140, groove height h 130, thickness t 150, device width w 210 and device length l 200 thus confining the localizing THz pulse and demonstrating the highly miniaturized THz switch.

For a complex geometry, the dispersion curves of the metallic gap structure 300 can be obtained by finite different time domain (FDTD) method.

Figure 4:
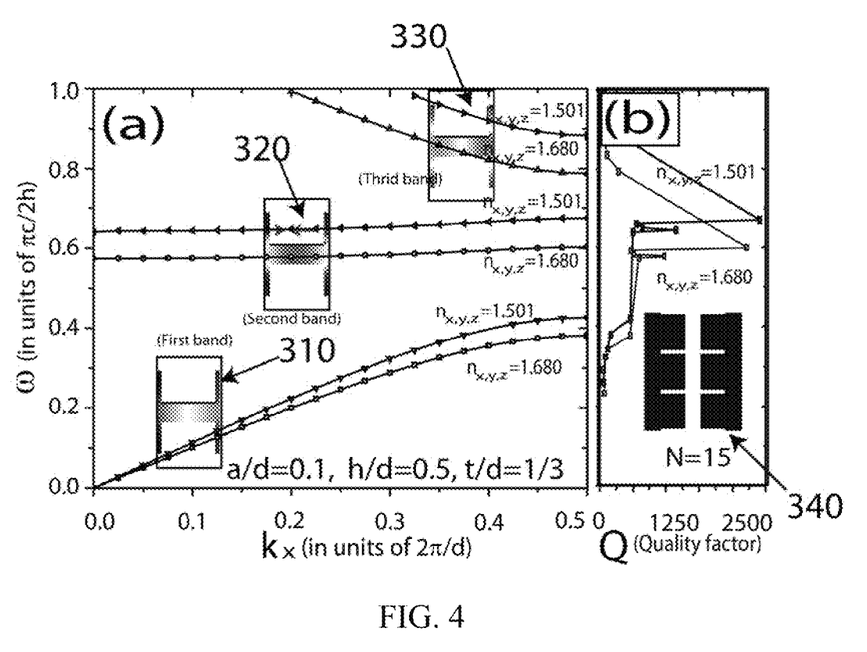
FIG. 4(a) shows the dispersion diagram of SSPP bound modes supported by the sandwiched conductor metamaterial.
FIG. 4(b) shows the quality factor Q for SSPP switch with the grooves (N=15).

FIG. 4(a) illustrates the dispersive curves of SSPP constrained by the sandwiched structures consisting of the SSPP switch 300 with geometrical parameters: a/d=0.1, h/d=0.5 and t/d=1/3. At n (refractive index)=1.501 and n=1.680, the SSPP dispersion curves can be obtained by finite difference time domain method (FDTD).

As shown in FIG. 4(a), the periodic corrugated metallic sandwiched gap structure 300 illustrates the interesting features contrast to one dimensional (1-D) periodic corrugated metallic array 100 as shown in FIG. 1. Specifically, the reflection symmetry through the plane z=0 generates multiple SSPP modes along the signal line, as shown in FIG. 4(a). The dispersion of first-band closely matches with that of 1-D array grooves. Additionally, the periodic x-direction symmetry creates the photonic band-gap.

Furthermore, the second band 320 with a flat-band is located at the region between the SSPP band-gap. Thus, this mode becomes a slow light in which the velocity of SSPP modes physically can be lowered. Furthermore, slow light enabled by resonant modes is promising method for shrinking the size of THz devices and controlling THz signal.

As shown in FIG. 4(b), the existence of structural resonant modes can be understood intuitively by considering the unit periodic cell acts like a THz cavity with small quality factor Q and the periodic unit cells are connected to each other with coupling coefficient. Physically, the periodic dielectric corrugated gap structure with refractive index (n>0) cannot support the strongly localized field because of the boundary condition. However, the metallic structure provides the structural resonant frequency, thus supporting confined SSPP modes, as shown in FIG. 4(a).

To obtain an efficient THz switch, we focus on the resonant SSPP modes for two fundamental reasons: small damping mechanism and strong SSPP confinement. First, to verify the small damping system at resonant frequency, we conduct the computation of the quality factor $Q \sim \omega_o/\gamma$ where $\gamma$ is the loss rate. The quality factor Q is useful in determining the system behavior in the resonant system. In our system, the net dimensionless decay rate can be rewritten as sum of two dominant decay rates: $1/Q=1/Q_r+1/Q_w$, where $1/Q_r$ and $1/Q_w$ denote the radiative and waveguide decay rates, respectively. To estimate the quality factor Q, we excite the Gaussian point source at the center of sandwiched structure 300 with groove numbers (N=15) 340 and analyze the response with the help of filter diagolization method. In this case, Q has a sharp peak at the specific frequency, thus verifying resonant modes and narrow bandpass filter.

Second, to demonstrate the subwavelength SSPP confinement at the resonant modes, the field profiles at three different frequencies are shown in FIG. 4(a). These figures show the magnetic-field ($H_y$) patterns of states localized about a corrugated metallic gap 210. By examining the field profiles, the first-band mode 310 shows the equally field distribution in the y-z plane. However, the third-band mode 330 exhibits the alternating two different field concentrations in the y-z domain. In particular, at the second band mode 320, the EM fields are mainly concentrated on the grooves, thus demonstrating strong SSPP subwavelength localization. Therefore, these features increase the high EM field intensity and sensitivity in a small volume, thus enhancing nonlinear optical effects for THz active devices such as switch and multiplexer.

Figure 5:
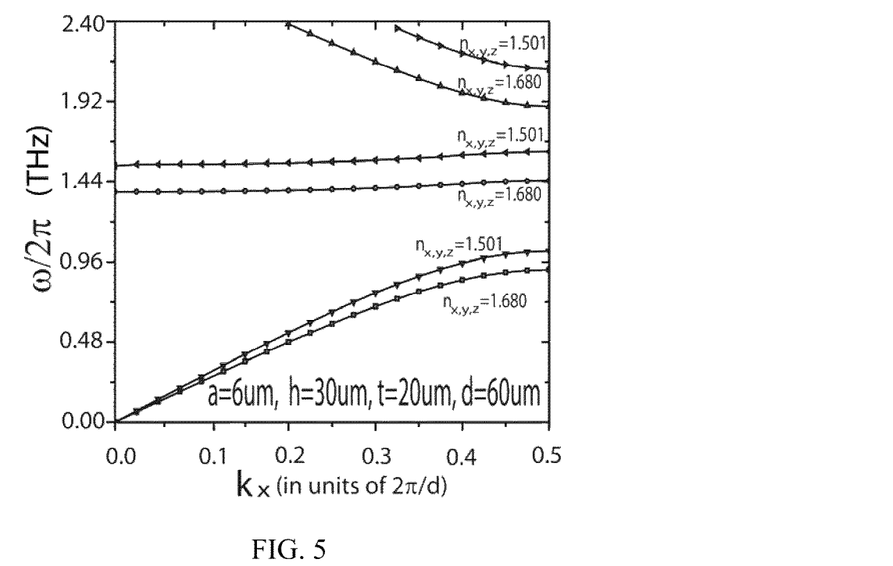
FIG. 5 illustrates dispersion graph of the SSPP modes supported by the sandwiched conductor metamaterial with geometrical parameters for a=6 µm, d=60 µm, h=30 µm, and t=20 µm.

In addition, for a more practical THz design we need to optimize guiding parameters that SSPP resonant modes are located in the THz domain. The key design rule is that SSPP resonant frequency is inversely proportional to the refractive index (n) 110 and height (h) 130 as similar to cutoff frequency $\omega_c = \pi c/2n_x h$ in the 1-D SSPP structure 100. FIG. 5 shows the TM dispersion relations of sandwiched conductor metamaterial supported by geometrical conditions: a=6 μm, d=60 μm, h=30 min, and t=20 μm. In detail, at n=1.501 and n=1.680, the resonant frequencies are about ω=1.60 THz and ω=1.45 THz, respectively. This resonant frequency modulation in our THz architecture enables us to control or steer the THz signal by manipulating the refractive indices 110 of periodic grooves.

We apply the theoretical approach to practical implementation. To turn signal lines ON and OFF based on a shift of resonance frequency, a large birefringence is warranted at a low control signal, thus offering significant flexibility into existing optoelectronic devices. For example, the refractive index change can be achieved by several methods such as conventional electro-optical and nonlinear bistable material.

We introduce the electro-optical material which has birefringence such as a nematic liquid crystal (N-LC) with the dielectric anisotropy defining as $\Delta n = n_e - n_o$, where $n_e$ and $n_o$ are refractive indexes parallel and perpendicular to the molecular axis. Furthermore, the LC birefringence can be easily controlled by changing alignment of LC based on a low voltage. In this way, the orientations of LC induced by electric field or optical excitation determine the three fundamental refractive indices of x-, y-, and z-axis, thus modifying the artificially engineered SSPP modes in the active THz switch.

Figure 6:
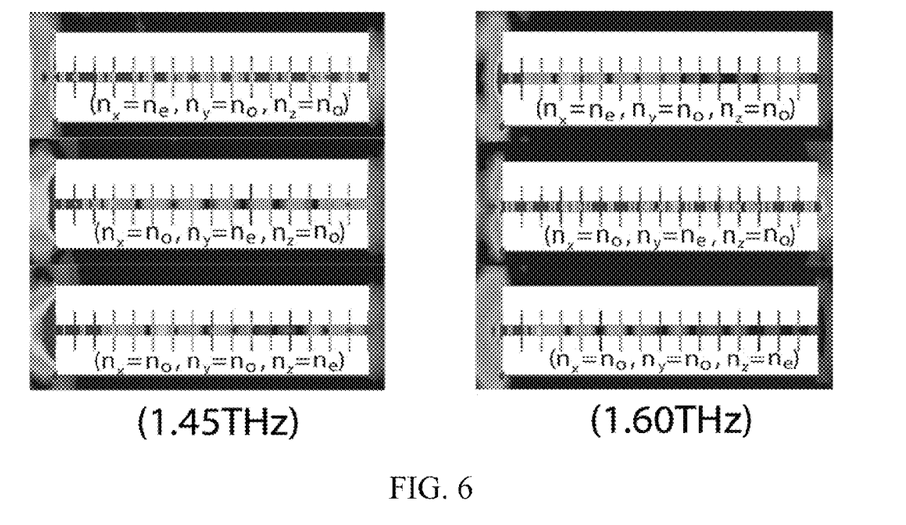
FIG. 6 shows the spatial distribution of the E-field along the active THz switch devices for three different fundamental LC orientations at 1.45, and 1.6 THz, respectively.

To confirm the dynamic switching operating at THz frequency based on the LC orientations, we conduct finite element simulation as shown in FIG. 6. Furthermore, contrast to FDTD simulation, we use biaxial medium from N-LC with $n_o=1.501$ and $n_e=1.680$. Therefore, we consider three fundamental LC orientations: $(n_x=n_e, n_y=n_o, n_z=n_o)$, $(n_x=n_o, n_y=n_e, n_z=n_o)$, and $(n_x=n_o, n_y=n_o, n_z=n_e)$. As expected from the TM dispersion analysis, the THz guided wave along the guiding gap is engineered by different LC orientations.

In particular, at 1.6 THz, the y alignment ($n_y=n_e$) of LC generates strongly coupled SSPP resonant modes, thus meaning ON-state. This field pattern is very similar to the resonant mode of FDTD simulation, as shown in FIG. 4(a). This extraordinary transmission can be explained by TM dispersion analysis, as shown in FIG. 5, because the SSPP modes based on the anisotropic medium are constrained by $n_x$ and $n_z$ as illustrated in (3). Therefore, the THz guided wave can be characterized by the isotropic medium (n=1.501), thus the resonant modes are located at 1.6 THz. On the other hand, x or z alignment of LC prohibits THz pulse signal along the metamaterial, thus denoting OFF-state.

Figure 7A:
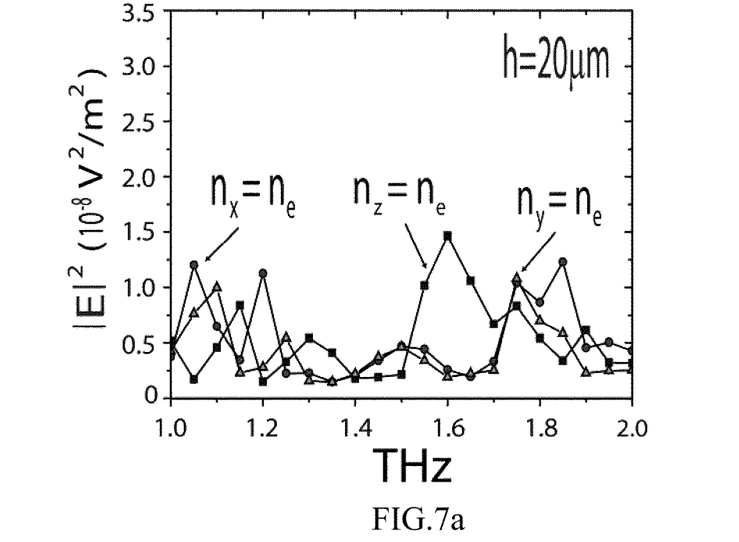
FIG. 7(a)-(c) shows E field amplitude versus frequency calculated at the output of THz switch in which the periodic lattice (d=60 µm) and groove width (a=6 µm) are fixed, and at the heights of 20, 30, and 40 µm, respectively.
Figure 7B:
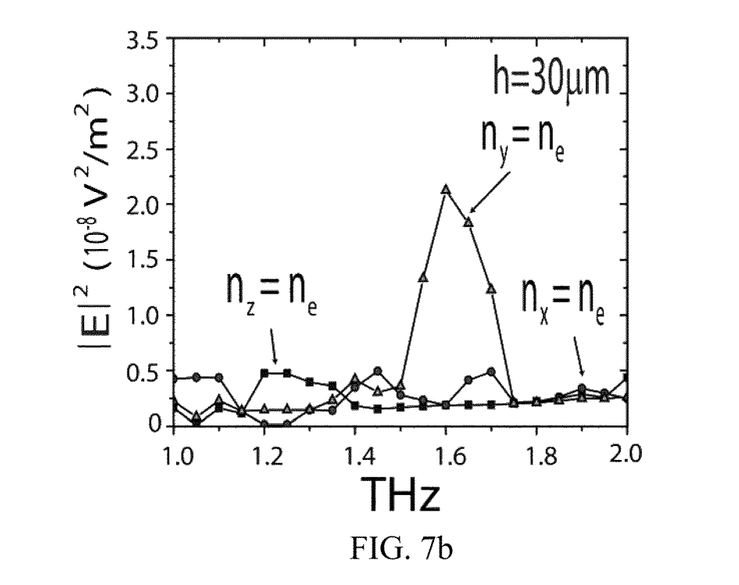
Figure 7C:
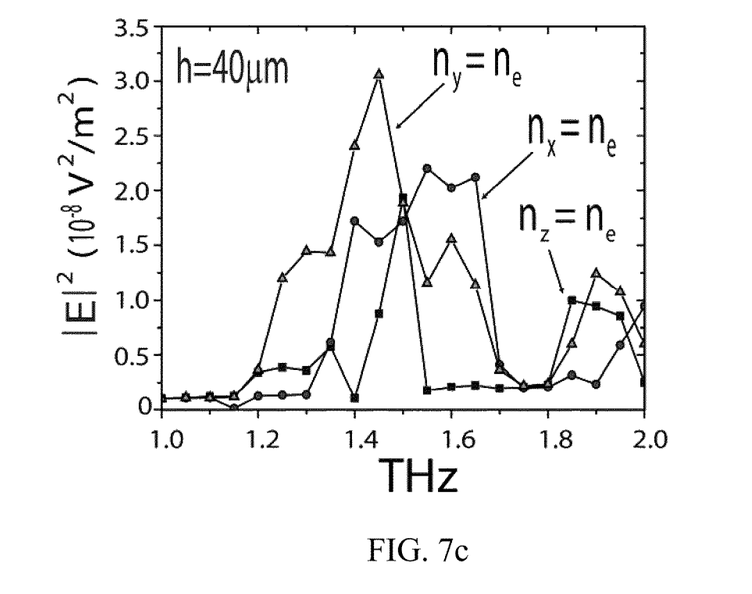
Figure 7D:
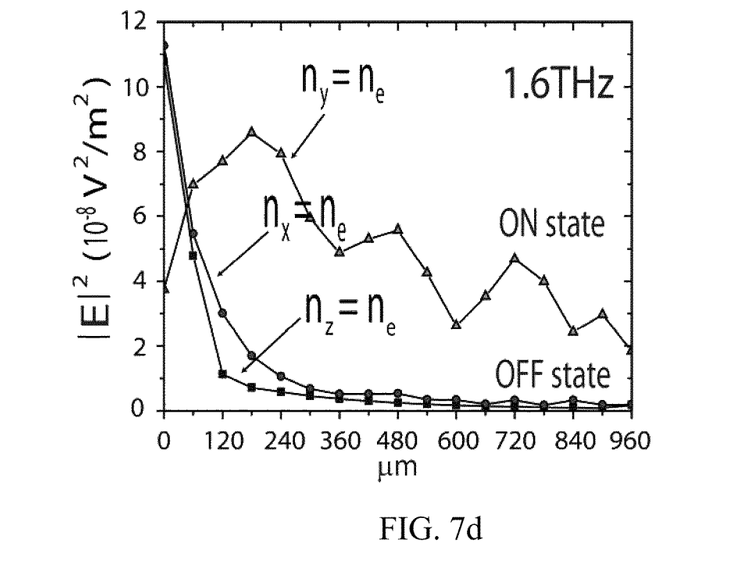
FIG. 7(d) shows magnitude of E field, evaluated at f=1.6 THz, along the x-direction at different locations of the metamaterials corresponding to three different fundamental LC orientations.

In order to obtain the optimal THz switching, FIG. 7(a)-(c) shows the E field amplitude calculated at the output of THz switch in which the periodic lattice 120 (d=60 min), groove width 140 (a=6 μm), and thickness 150 (t=20 μm) are fixed, and at the heights 130 (h) of 20, 30, and 40 μm, respectively. As shown, the transmittance of the SSPP bound modes along the gap can be controlled by the guiding geometry, operation frequency f, and refractive index n 110. In addition, a dramatic dependence of the height of the corrugated structure is clearly visible. The increase in E magnitude with increasing height between 1 and 2 THz is due to the large depth of indentation leading to strong EM field penetration into the metallic side. Furthermore, the optimal guiding switching can be obtained at 1.6 THz with h=30 μm, thus obtaining approximately maximum 10.51-dB extinction ratio defined as $r_e=10 \log(P_{ON}/P_{OFF})$ with ON-state (Y alignment) and OFF-state (X or Z alignment), as shown in FIG. 7(b). In addition, FIG. 7(d) shows the signal attenuation at different locations of metamaterial with a height h 130 of 30 μm at 1.6 THz corresponding to three different LC orientations. It is apparent from FIG. 7(d), the extraordinary SSPP resonance between grooves, in the ON (Y alignment)-state, leads to the small signal attenuation. However, in the OFF-state (X or Z alignment), the signal loss has large signal attenuation.

Figure 8:
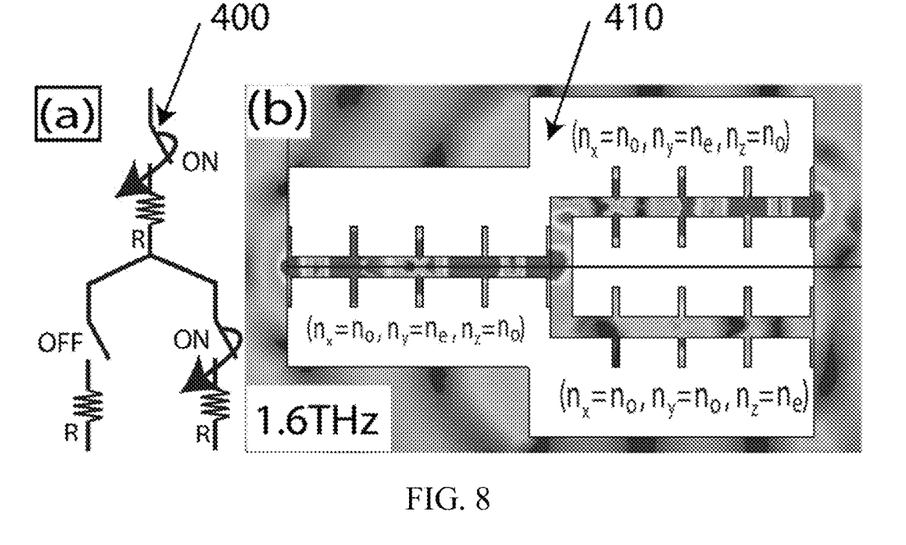
FIG. 8(a) shows the equivalent circuit of the THz Y-junction switch with three control signals
FIG. 8(b) shows the spatial distributions of the E-field along the THz Y-junction switch.

More importantly, this simple linear structure 300 designed for the optimal switching condition can be easily extended to more complex logic elements. FIG. 8(a) shows the equivalent circuit model 400 of a Y-junction THz switch 410 containing four grooves in each section and independent control signal line. As shown in FIG. 8(b), this THz circuit model can be easily realized by manipulating the combination sets of LC orientation. In the case of Y-junction switching, we can obtain intuitively understanding of signal transmission by applying coupled mode theory. Since each junction can be considered as a weak resonant cavity which is adjacent to THz waveguides, the transmission in ON-state or OFF-state depends on the specific junction geometry.

In practical Y-junction realizations 410, we need to consider the impedance matching issues between each junctions and THz corrugated waveguides. Additionally, the signal lines consisting of small grooves can solve the possible issues such as uniform N-LC alignment under an electric field or inherent LC damping. Furthermore, the geometry is simple to fabricate and can be easily implemented to execute THz Boolean logic algorithm.

Figure 9:
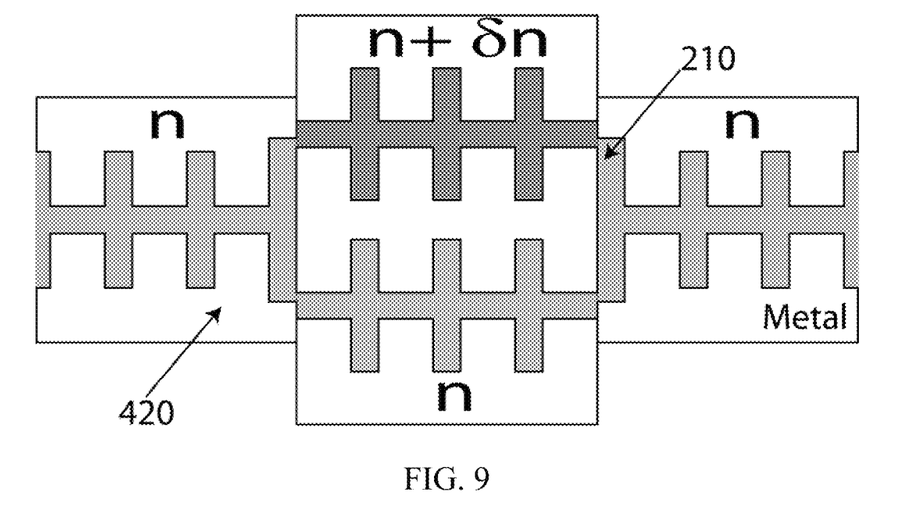
FIG. 9 shows the schematic diagram of a THz Mach-Zehnder interferometer.

For a further logic block, we can build up the terahertz Mach-Zehnder interferometer 420 as shown in FIG. 9. In detail, the terahertz Mach-Zehnder interferometers 420 can be designed by changing of wavevector k at small refractive index modulation $\delta n/n \sim O(0.001)$. In detail, the induced phase change of metallic gap 210 $\delta \Phi = L \delta k$, where L is the length of the interferometer. The $\delta k$ can be calculated by the perturbation theory:

$$\delta k \sim \frac{\omega_o}{v_g} \frac{\delta n}{n} \int (\varepsilon |E|^2) \quad (4)$$

where $\omega_o$ is resonant frequency and $v_g$ is group velocity. As shown in Eqn. (4), the bandwidth compression, THz field enhancement and slow light propagation of the corrugated perfect conductor metamaterial significantly increases the phase shift, thus providing the promising way for the large shift of wavevector ($\delta k$) at small length scale. Thus, the overall length of the structure will be much smaller than a conventional device because of the slow wave nature of SSPP propagation.

Device Challenges

Till now, we focus on the dynamic control of SSPP signal at terahertz frequencies by modulating the refractive index of N-LC material. However, further consideration is must given for practical implementation of the core idea.

Figure 10:
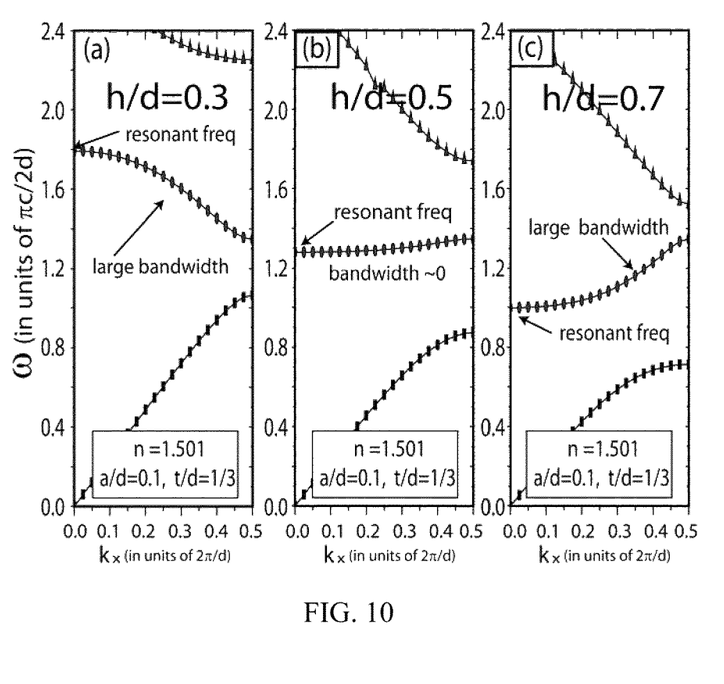
FIG. 10 shows the dispersion diagrams of SSPP bound modes supported by the sandwiched conductor metamaterials with geometrical parameters a/d=0.1, t/d=1/3, and n=1.501 for three different choices of h/d.

First, the main physical issue stems from limited bandwidth. In principle, the dramatic slow down and efficient energy transfer can be achieved by using resonant modes. However, the operation of resonant modes imposes significant bandwidth constraints, thereby limiting the range of available operational frequencies. For example, as shown in FIG. 4(a), the bandwidth of second-band 320 is almost zero. To increase the bandwidth of second-band mode 320, we can design the bandwidth by choosing appropriate waveguide structures. For example, we can change geometrical parameter h/d based on the guiding parameters a/d=0.1, t/d=1/3, and n=1.501, as shown in FIG. 10. More specifically, for small height h/d=0.3 and large height h/d=0.7, the bandwidth of second mode 320 is large. However, for medium height h/d=0.5, the bandwidth of second mode 320 goes to zero, thus compressing the bandwidth of THz pulse, as shown in FIG. 10(b). Even though bandwidth compression enables designers to spatially compress the pulse width and increase the internal fields, the small bandwidth is not desirable in THz applications. Therefore, it is essential to consider the delay-bandwidth product for an efficient THz switching device.

Second, the switching speed of LC is significantly lower than conventional EO materials such as $KH_2PO_4$ or $LiNbO_3$. This difficulty can be addressed by using other methods such as nonlinear EO, optically controlled, or loss-induced material. Recently, SPP signals in metallic on dielectric waveguides can be controlled by using the phase transition of crystalline gallium. As an alternative for SSPP routing, this phase transition owing to the temperature change or external optical excitation provides strong modulation strength ($\delta n/n$) and relatively fast switching speed.

Third, the inherent attenuation of LC in the THz domain may have an influence on SSPP dispersion, thereby changing resonant modes, bandwidth and quality factor (Q). In general, the SSPP dispersion mode strongly depends on the dispersive modulation ($\delta n$) and absorptive modulation ($\delta a$). Since absorption is strongly related to signal attenuation, absorption modulation is not broadly considered as a switching mechanism. However, absorption modulation ($\delta a$) may extend the degree of freedom for signal routing similar to absorptive optical bistability method.

Fourth, the device performance depends on the polarization of the incident THz field. Therefore, the THz circuit system requires the TM polarizer at the input port.

Figure 11:
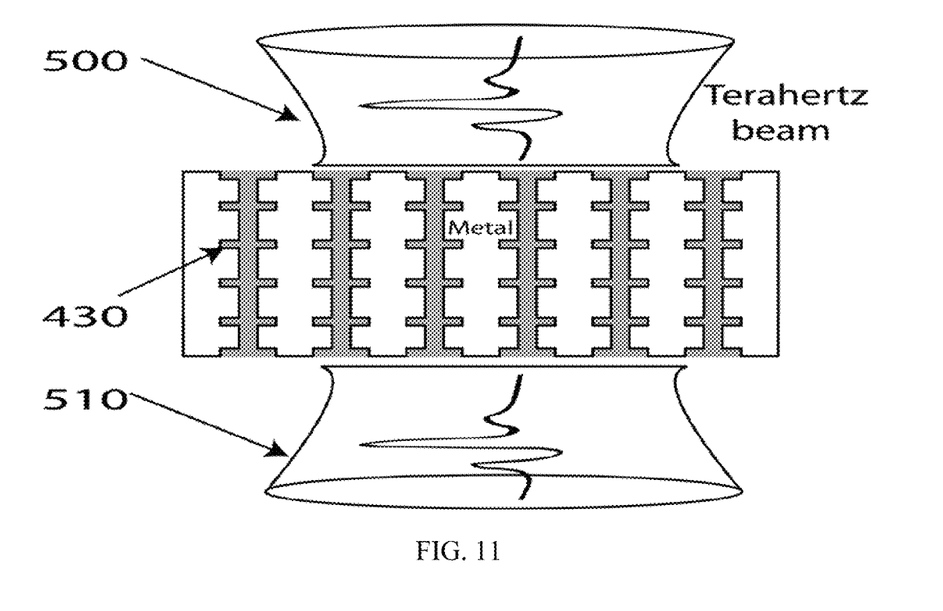
FIG. 11 shows the THz waveguide and switching system with a periodic arrangement of cut through corrugated slits.

Fifth, the insertion loss at the input port 500 has a large value because the input port and subwavelength gap structure 300 have a significant impedance mismatch. To decrease the momentum mismatch, we can design THz waveguides or switching systems with a periodic arrangement of cut through corrugated slits 430 as illustrated in FIG. 11. This arrangement may lead to solve the momentum mismatch between the gap structure 430 and input port 500, thus obtaining the high field intensity at the output port 510.

Finally, the device implementation such as electrical contacts cannot be easily made. For example, in the case of Y-junction switch 410, if we assume that the electric contacts placed directly onto corrugated metallic structures, the metallic structure has physically the same voltage value. To obtain the different voltage configurations between signal lines, the device designers need to obtain electrically disconnected metallic lines. In addition, electric contacts in the immediate vicinity of confined SSPP modes may result in additional signal loss. Therefore, it is essential to find a way to minimize the signal loss.

However, even though there remain many unresolved challenges to design experimental plasmon logic gates, the basic method presented here provides promising possibilities for the active THz device occupying an area of several micrometer square. In particular, the proposed linear Y-junction 410 switching devices operate as a 1:2 multiplexer, a fundamental building block in the digital systems.

Having described the invention regarding several preferred embodiments thereof, various modification, omission and addition will now certainly suggest itself to those skilled in the art. Thus, the invention is not to be limited to the disclosed embodiments other than as needed by the appended claims.

What is claimed is:

1. A dynamic switch for controlling propagation of a terahertz signal comprising: (a) a double-corrugated metallic waveguide having an array of uniformly sized periodic grooves located on two opposite inner surfaces of the waveguide wherein a height, width, periodicity of grooves, and distance between opposite grooves are of sub-wavelength dimensions; (b) the waveguide includes dielectric material between the metallic surfaces wherein the dielectric material consists of nematic liquid-crystal (N-LC) having birefringence property, or nonlinear ferro-electrical or optical materials; and (c) the double-corrugated metallic waveguide having two ends that provide the input of said dynamic switch and the output of said dynamic switch.

2. The terahertz dynamic switch of claim 1, wherein a resonant mode can be characterized by resonant frequency and quality factor.

3. The terahertz dynamic switch of claim 1, wherein slow EM wave modes can be tailored by changing the height and thickness of said periodic array of grooves.

4. The terahertz dynamic switch of claim 1, wherein slow EM wave modes can be tailored by changing the refractive index of the dielectrics.

5. The terahertz dynamic switch of claim 1, wherein said dynamic switch can be extended to a terahertz Y junction multiplexer.

6. The terahertz dynamic switch of claim 1, wherein said dynamic switching can be extended to a terahertz Mach-Zehnder interferometer.

7. A method of forming an optimal terahertz dynamic switch comprising: (a) providing an array of uniformly sized periodic grooves located on two opposite inner metallic surfaces of a double-corrugated metallic waveguide wherein a height, width, periodicity of grooves, and distance between opposite grooves are of sub-wavelength dimensions; and (b) providing dielectric material between the metallic surfaces wherein the dielectric material consists of nematic liquid-crystal (N-LC) having birefringence property, or nonlinear ferro-electrical or optical materials.

8. The method of claim 7, wherein resonant modes can be characterized by resonant frequency and quality factor.

9. The method of claim 7, wherein slow EM wave modes can be tailored by changing the height and thickness of said periodic array of grooves.

10. The method of claim 7, wherein slow EM wave modes can be tailored by changing the refractive index of the dielectrics.

11. The method of claim 7, wherein said dynamic switch can be extended to a terahertz Y junction multiplexer.

12. The method of claim 7, wherein said dynamic switching can be extended to a terahertz Mach-Zehnder interferometer.

* * * * *